(12) United States Patent
Tzeng (10) Patent No.: US 11,126,532 B1
(45) Date of Patent: Sep. 21, 2021

(54) METHOD AND APPARATUS FOR A PARALLEL, METADATA-BASED TRACE ANALYTICS PROCESSOR

(71) Applicant: TELEDYNE LECROY, INC., Thousand Oaks, CA (US)

(72) Inventor: Fred Tzeng, Loomis, CA (US)

(73) Assignee: TELEDYNE LECROY, INC., Thousand Oaks, CA (US)

( * ) Notice: Subject to any disclaimer, the term of this patent is extended or adjusted under 35 U.S.C. 154(b) by 0 days.

(21) Appl. No.: 16/684,358

(22) Filed: Nov. 14, 2019

Related U.S. Application Data

(60) Provisional application No. 62/767,047, filed on Nov. 14, 2018.

(51) Int. Cl.
*G06F 9/44* (2018.01)
*G06F 11/34* (2006.01)
*G06F 16/907* (2019.01)
*G06F 9/38* (2018.01)

(52) U.S. Cl.
CPC ........ *G06F 11/3476* (2013.01); *G06F 9/3871* (2013.01); *G06F 11/3461* (2013.01); *G06F 11/3485* (2013.01); *G06F 16/907* (2019.01)

(58) Field of Classification Search
None
See application file for complete search history.

(56) References Cited

U.S. PATENT DOCUMENTS

| 7,600,221 | B1* | 10/2009 | Rangachari | G06F 9/3808 717/131 |
| 2008/0098207 | A1* | 4/2008 | Reid | G06F 11/3636 714/E11.207 |
| 2008/0256339 | A1* | 10/2008 | Xu | G06F 9/3808 712/216 |
| 2018/0285136 | A1* | 10/2018 | Mola | G06F 11/3636 |

* cited by examiner

*Primary Examiner* — Qamrun Nahar
(74) *Attorney, Agent, or Firm* — K&L Gates LLP (57) ABSTRACT

Method and apparatus for a parallel, metadata-based trace analytics processor is disclosed. The trace analytics processor is able to asynchronously parallelize the processing operation and use metadata about each parallel operation intelligently. The result is the ability to get analytics results quickly, efficiently, and in real time.

10 Claims, 5 Drawing Sheets

METHOD AND APPARATUS FOR A PARALLEL, METADATA-BASED TRACE ANALYTICS PROCESSOR

CLAIM OF BENEFIT TO PRIOR APPLICATION

This application claims benefit to U.S. Provisional Patent Application 62/767,047, entitled "Method and Apparatus for a Parallel, Metadata-Based Trace Analytics Processor," filed Nov. 14, 2018. The U.S. Provisional Patent Application 62/767,047 is incorporated herein by reference.

BACKGROUND

Embodiments of the invention described in this specification relate generally to processing trace files, and more particularly, to an asynchronous parallelizing trace analytics method for asynchronously parallelizing processing operations in a trace analytics processor and intelligently using metadata about each parallel processing operation to generate analytics results in real time.

System trace files containing log information, measurements, or other data are typically time sequenced and rich with information, but can be massive in size and can also stream endlessly. An analytics processor for these files needs to be able to ingest and analyze the information quickly and efficiently so as to avoid building up a back log of events.

Other systems use a conventional method of processing time sequenced trace files by interrogating the entire file from start to finish and then processing the necessary outputs as the file is read.

Therefore, what is needed is a way to asynchronously parallelize the processing operation in a processor and use metadata about each parallel operation intelligently to get analytics results quickly, efficiently, and in real time.

BRIEF DESCRIPTION

Some embodiments of the invention include a novel asynchronous parallelizing trace analytics method for asynchronously parallelizing processing operations in a trace analytics processor and intelligently using metadata about each parallel processing operation to generate analytics results in real time. In some embodiments, the asynchronous parallelizing trace analytics method includes a plurality of steps comprising (i) obtaining an input trace, (ii) stepping through a plurality of windows of the trace and extracting metadata about each window, (iii) storing the extracted metadata about each window of the trace for later use, (iv) starting calculation of targeted statistics for the trace, (v) checking the metadata for each window of the trace to see if calculation of the targeted statistics is needed, (vi) calculating the targeted statistics for the window when (and only when) calculation is needed, (vii) repeating the check and calculation (as needed) for each window of the trace, and (viii) aggregating the results of the calculations of targeted statistics for the trace. In some embodiments, the asynchronous parallelizing trace analytics method steps through the plurality of windows of the trace and extracts metadata about each window in the plurality of windows of the trace in parallel by a plurality of worker threads or processes. In some embodiments, the asynchronous parallelizing trace analytics method performs calculation of targeted statistics for all windows in the plurality of windows of the trace in parallel by a plurality of worker threads or processes.

In some embodiments, the asynchronous parallelizing trace analytics method is a multi-trace asynchronous parallelizing trace analytics method that processes a plurality of traces. In some embodiments, the multi-trace asynchronous parallelizing trace analytics method includes a plurality of steps comprising (i) obtaining a plurality of traces, (ii) stepping through a plurality of windows of all traces in the plurality of traces and extracting metadata about each window in the plurality of windows of all traces in the plurality of traces, (iii) storing the extracted metadata about each window in the plurality of windows of all traces in the plurality of traces for later use, (iv) starting calculation of targeted statistics for the plurality of traces when extraction of metadata about each window in the plurality of windows of all traces in the plurality of traces is completed, (v) determining whether calculation of targeted statistics about each window in the plurality of windows of all traces in the plurality of traces is needed by checking the metadata of each window in the plurality of windows of all traces in the plurality of traces, (vi) calculating the targeted statistics for each window in which calculation is determined to be needed, and (vii) aggregating a result set of targeted statistics based on the calculations of targeted statistics for all traces in the plurality of traces. In some embodiments, the multi-trace asynchronous parallelizing trace analytics method steps through the plurality of windows of all traces in the plurality of traces and extracts metadata about each window in the plurality of windows of all traces in the plurality of traces in parallel by a plurality of worker threads or processes. In some embodiments, the multi-trace asynchronous parallelizing trace analytics method performs calculation of targeted statistics for all windows in the plurality of windows over all traces in the plurality of traces in parallel by a plurality of worker threads or processes.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel asynchronous parallelizing trace analytics method for asynchronously parallelizing processing operations in a trace analytics processor and intelligently using metadata about each parallel processing operation to generate analytics results in real time. In some embodiments, the asynchronous parallelizing trace analytics method includes a plurality of steps comprising (i) obtaining an input trace, (ii) stepping through a plurality of windows of the trace and extracting metadata about each window, (iii) storing the extracted metadata about each window of the trace for later use, (iv) starting calculation of targeted statistics for the trace, (v) checking the metadata for each window of the trace to see if calculation of the targeted statistics is needed, (vi) calculating the targeted statistics for the window when (and only when) calculation is needed, (vii) repeating the check and calculation (as needed) for each window of the trace, and (viii) aggregating the results of the calculations of targeted statistics for the trace. In some embodiments, the asynchronous parallelizing trace analytics method steps through the plurality of windows of the trace and extracts metadata about each window in the plurality of windows of the trace in parallel by a plurality of worker threads or processes. In some embodiments, the asynchronous parallelizing trace analytics method performs calculation of targeted statistics for all windows in the plurality of windows of the trace in parallel by a plurality of worker threads or processes.

In some embodiments, the asynchronous parallelizing trace analytics method is a multi-trace asynchronous parallelizing trace analytics method that processes a plurality of traces. In some embodiments, the multi-trace asynchronous parallelizing trace analytics method includes a plurality of steps comprising (i) obtaining a plurality of traces, (ii) stepping through a plurality of windows of all traces in the plurality of traces and extracting metadata about each window in the plurality of windows of all traces in the plurality of traces, (iii) storing the extracted metadata about each window in the plurality of windows of all traces in the plurality of traces for later use, (iv) starting calculation of targeted statistics for the plurality of traces when extraction of metadata about each window in the plurality of windows of all traces in the plurality of traces is completed, (v) determining whether calculation of targeted statistics about each window in the plurality of windows of all traces in the plurality of traces is needed by checking the metadata of each window in the plurality of windows of all traces in the plurality of traces, (vi) calculating the targeted statistics for each window in which calculation is determined to be needed, and (vii) aggregating a result set of targeted statistics based on the calculations of targeted statistics for all traces in the plurality of traces. In some embodiments, the multi-trace asynchronous parallelizing trace analytics method steps through the plurality of windows of all traces in the plurality of traces and extracts metadata about each window in the plurality of windows of all traces in the plurality of traces in parallel by a plurality of worker threads or processes. In some embodiments, the multi-trace asynchronous parallelizing trace analytics method performs calculation of targeted statistics for all windows in the plurality of windows over all traces in the plurality of traces in parallel by a plurality of worker threads or processes.

As stated above, system trace files containing log information, measurements, or other data are typically time sequenced and rich with information, but can be massive in size and can also stream endlessly. An analytics processor for these files needs to be able to ingest and analyze the information quickly and efficiently so as to avoid building up a back log of events. Embodiments of the asynchronous parallelizing trace analytics method for asynchronously parallelizing processing operations in a trace analytics processor and intelligently using metadata about each parallel processing operation to generate analytics results in real time described in this specification solve such problems by utilizing a trace analytics processor that is able to asynchronously parallelize the processing operation and use metadata from each parallel operation intelligently. The result is the ability to get analytics results quickly, efficiently, and in real time.

Embodiments of the asynchronous parallelizing trace analytics method for asynchronously parallelizing processing operations in a trace analytics processor and intelligently using metadata about each parallel processing operation to generate analytics results in real time described in this specification differ from and improve upon currently existing conventional methods which process time sequenced trace files by interrogating the entire file from start to finish and then processing the necessary outputs as the file is read. In contrast, the trace analytics method of the present disclosure is able to asynchronously parallelize the processing operation and use metadata about each parallel operation intelligently to obtain relevant analytics results quickly, efficiently, and in real time.

In addition, some embodiments of the asynchronous parallelizing trace analytics method for asynchronously parallelizing processing operations in a trace analytics processor and intelligently using metadata about each parallel processing operation to generate analytics results in real time improve on the efficiency and speed of the conventional method of processing a trace file. Specifically, the conventional method is a brute force method that is only able to process one event at a time, resulting in slow processing. Furthermore, the conventional method can only process events sequentially and is unable to handle cases when the events in the trace file are out of sequence. However, the asynchronous parallelizing trace analytics method is not constrained to sequential processing, but instead, is able to asynchronously parallelize the processing operation and use metadata about each parallel operation efficiently and intelligently to obtain analytics results much faster than the conventional method.

The asynchronous parallelizing trace analytics method for asynchronously parallelizing processing operations in a trace analytics processor and intelligently using metadata about each parallel processing operation to generate analytics results in real time of the present disclosure may be comprised of the following steps and elements. This list of possible constituent steps and elements is intended to be exemplary only and it is not intended that this list be used to limit the asynchronous parallelizing trace analytics method of the present application to just these steps or just these elements. Persons having ordinary skill in the art relevant to the present disclosure may understand there to be equivalent steps and/or elements that may be substituted within the present disclosure without changing the essential function or operation of the asynchronous parallelizing trace analytics method.

1. Input trace(s).
2. Step through a plurality of windows of the trace and gather (extract) metadata about each window, or portion, of the trace.
3. Store the metadata about each window (portion) for later use, while continuing to iterate through the trace.
4. Start the calculation of targeted statistics for the trace when metadata extraction is completed for the trace.
5. While stepping through the trace for calculations per window (portion) of the trace, check the metadata for that window to see if a calculation is needed. When a window's metadata calculations are not needed, skip the window. Otherwise, when window statistics are needed, calculate the statistics for the window.
6. After calculating statistics for windows of the trace, aggregate the results.

The various steps and elements of the asynchronous parallelizing trace analytics method for asynchronously parallelizing processing operations in a trace analytics processor and intelligently using metadata about each parallel processing operation to generate analytics results in real time of the present disclosure may be related in the following exemplary fashion. It is not intended to limit the scope or nature of the relationships between the various steps or elements and the following examples are presented as illustrative examples only.

Figure 1:
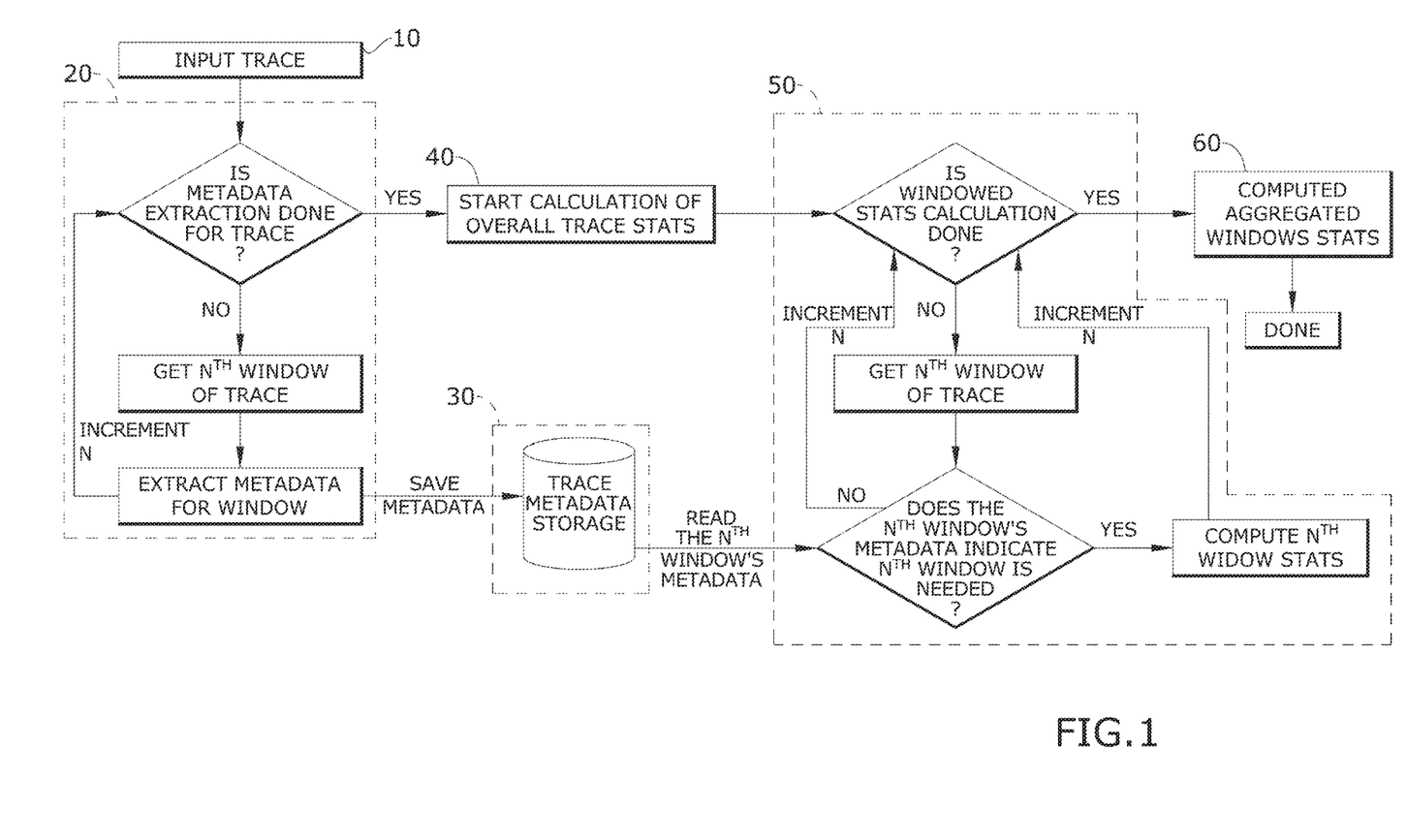
FIG. 1 conceptually illustrates an asynchronous parallelizing trace analytics method for asynchronously parallelizing processing operations in a trace analytics processor and intelligently using metadata about each parallel processing operation to generate analytics results in real time in some embodiments.

By way of example, FIG. 1 conceptually illustrates an asynchronous parallelizing trace analytics method for asynchronously parallelizing processing operations in a trace analytics processor and intelligently using metadata about each parallel processing operation to generate analytics results in real time. As shown in this figure, the asynchronous parallelizing trace analytics method is demonstrated as flow chart steps in generalized block diagram form. Specifically, the asynchronous parallelizing trace analytics method starts with inputting a trace (at 10). The trace can be input as a trace file or read from memory. When the trace input is read in from file or memory buffer, the asynchronous parallelizing trace analytics method steps through the trace and extracts metadata (at 20) about each window, or portion, of the trace. In some embodiments, the asynchronous parallelizing trace analytics method steps through a plurality of windows of the trace and extracts metadata (at 20) by repeating a set of operations for each window. In some embodiments, multiple relational decisions and comparisons are utilized to check for metadata extraction accuracy and error conditions. The repeated set of operations for stepping through the plurality of windows of the trace and extracting metadata shown in this figure include (i) determining whether metadata extraction is completed for the trace, (ii) getting a particular window "N" of the trace when metadata extraction is not completed for the trace (where N is an incremented value to identify each window of the trace), and (iii) extracting metadata for the window. This set of operations is repeated by incrementing the value "N" for the metadata of each window to be extracted.

The asynchronous parallelizing trace analytics method for asynchronously parallelizing processing operations in a trace analytics processor and intelligently using metadata about each parallel processing operation to generate analytics results in real time can flexibly handle various window sizes and window alignments in the trace. Specifically, window size can be of any size, but must be less than the overall trace size. The windows are typically uniform size, but can also be of variable size. Furthermore, the windows can be overlapping, or they can be aligned such that each window begins at the end of the previous window. For a given input trace, it is therefore possible to have only overlapping windows, only aligned windows, or a mixture of overlapping and aligned windows for the full trace. For each window, when the metadata of the window is extracted from the trace, the asynchronous parallelizing trace analytics method saves the metadata into a trace metadata storage (at 30) for later use. In some embodiments, saving the metadata in the trace metadata storage (at 30) occurs contemporaneously with incrementing the value "N". However, in some embodiments, the set of operations for stepping through the trace and extracting metadata for each window is parallelized for multiple windows, so that each window is processed contemporaneously with each other window being stepped through to extract metadata. Parallelized operations for stepping through the trace and extracting metadata for each window are described further below, by reference to FIG. 2.

After saving the extracted metadata for the window in the trace metadata storage (at 30), the asynchronous parallelizing trace analytics method increments the value "N" and returns back to the first operation of stepping through the trace and extracting metadata (at 20), namely, determining whether metadata extraction is completed for the trace. When metadata extraction is completed for the trace, the asynchronous parallelizing trace analytics method of some embodiments starts calculation of overall trace statistics (at 40). Calculation of overall trace statistics (at 40) depends on which windows need to be included for computation of window statistics. This involves deciding whether any computations are needed for each window based on the previously extracted metadata for the window. When computations are not needed, the asynchronous parallelizing trace analytics method skips to the next window and repeats the process. On the other hand, when computations are needed, the asynchronous parallelizing trace analytics method computes the required statistics for the window. Note that the computation for each window can be a parallelized operation, since the computation do not require data from other windows. Details of parallelized computation of each window is described further below, by reference to FIG. 2. Also note that by deciding whether a computation is needed for a window based on the extracted metadata, it is possible to potentially save a lot of resources by avoiding computations if the window is not of interest. Then, after all the necessary computations are done for the windows, the asynchronous parallelizing trace analytics method aggregates data from various windows and performs an overall computation, if needed. Specific details of these steps, as shown in FIG. 1, are described next.

Specifically, calculation of overall trace statistics (at 40) involves computations on various windows of the trace. In some embodiments, the computations on various windows of the trace includes several steps of iterating through each window of the trace to determine whether computation is needed for each window and computing window statistics when needed (at 50). In some embodiments, the several steps of iterating through each window of the trace to determine whether computation is needed for each window and computing window statistics when needed (at 50) include (i) determining whether windowed statistics calculations are completed for all windows in need of computation, (ii) getting each window of the trace (by way of increment counter "N"), (iii) retrieving metadata for the given ($N^{th}$) window from the trace metadata storage (at 30) and determining whether the metadata from the given ($N^{th}$) window indicates that the given ($N^{th}$) window is needed, (iv) computing window statistics for the given ($N^{th}$) window based on the retrieved metadata when (and only when) the given ($N^{th}$) window is determined to be needed, and (v) incrementing the value "N" and returning to the determination of whether windowed statistics calculation is completed. When windowed statistics calculation is done, the asynchronous parallelizing trace analytics method of some embodiments computes aggregated window statistics (at 60). This includes all the computed window statistics, but would not include statistics from any skipped windows, as those windows were determined to be not of interest. After computing aggregated window statistics (at 60), the asynchronous parallelizing trace analytics method ends.

Figure 2:
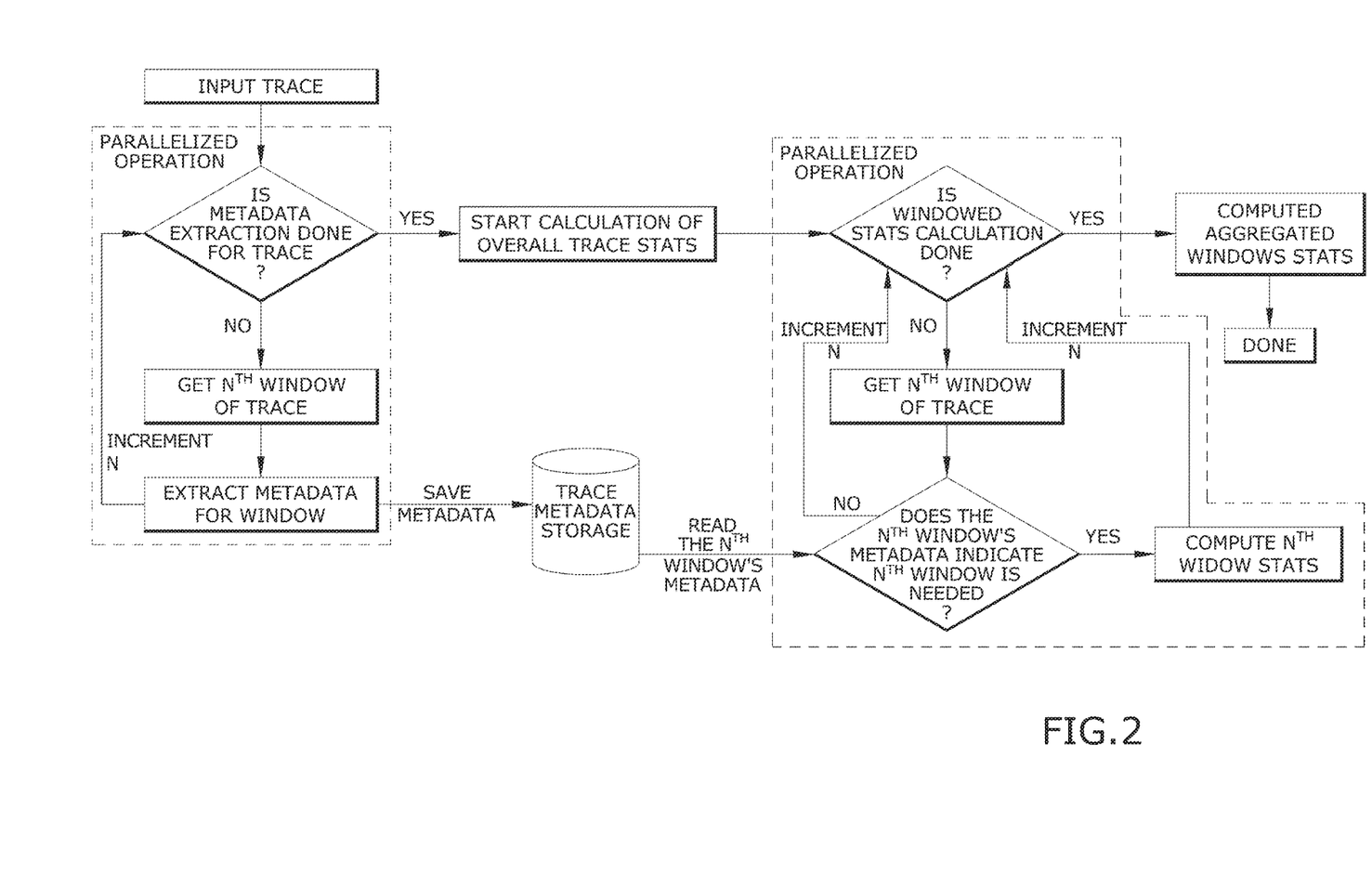
FIG. 2 conceptually illustrates the asynchronous parallelizing trace analytics method, demonstrating parallelized extraction of metadata and parallelized windowed statistics computation in some embodiments.

Turning now to an example of the asynchronous parallelizing trace analytics method in which metadata extraction operations and window statistics calculations are parallelized, FIG. 2 conceptually illustrates the asynchronous parallelizing trace analytics method, highlighting parallelized extraction of metadata for multiple windows of the input trace and parallelized calculation of window statistics. Parallelized extraction of metadata is possible since the metadata of each window need not depend on metadata from another window. In some embodiments, subroutines are used to drive parallel operations for the metadata extraction and the windowed statistics calculations.

The parallelized extraction of metadata is shown in this figure by the dashed box surrounding the operations of the asynchronous parallelizing trace analytics method for stepping through the trace and extracting metadata (at 20). The parallelized extraction of metadata is accomplished by performing extraction of the metadata for each window simultaneously or contemporaneously with all the other windows. This can be done by, for example, launching a thread of execution for each window and extracting the metadata by each thread at nearly the same time. The extraction of the metadata is typically a lightweight computation, such as finding the occurrences of particular events, but can also be a more heavyweight computation, such as computing averages within a window. Nevertheless, parallelizing the extraction of metadata across multiple windows of the trace improves overall performance of the asynchronous parallelizing trace analytics method.

Similarly, the operations for windowed statistics calculation are shown in this figure as being parallelized. Specifically, the several steps of iterating through each window of the trace to determine whether computation is needed for each window and computing window statistics when needed (at 50), described above by reference to FIG. 1, can be parallelized to proceed simultaneously or contemporaneously with each other window evaluation. Thus, by parallelizing the operations for extracting metadata and performing windowed statistics calculations, the asynchronous parallelizing trace analytics method efficiently processes the trace to provide relevant information in real time.

Figure 3:
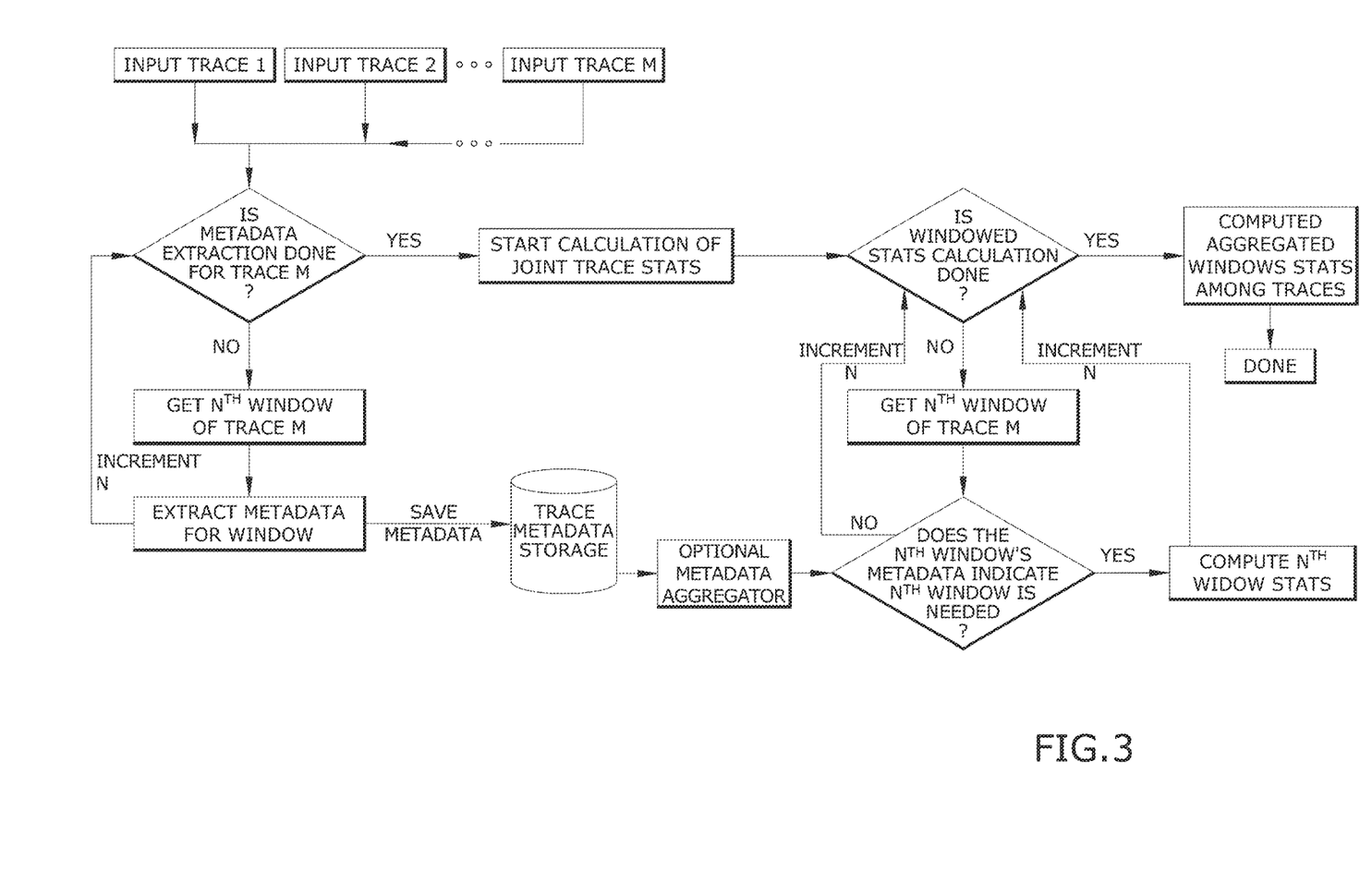
FIG. 3 conceptually illustrates the asynchronous parallelizing trace analytics method, demonstrating metadata extraction among multiple traces and computation of joint statistics among the multiple traces in some embodiments.

By way of example, FIG. 3 conceptually illustrates the asynchronous parallelizing trace analytics method, demonstrating metadata extraction among multiple traces and computation of joint statistics among the multiple traces in some embodiments. Another variation of the asynchronous parallelizing trace analytics method is demonstrated in this figure. Specifically, the asynchronous parallelizing trace analytics method is employed to compute joint statistics among a plurality of traces (i.e. "INPUT TRACE 1", "INPUT TRACE 2", "INPUT TRACE M"). First, metadata is extracted for each window of each trace and saved in storage. This can be done in sequence or in parallelized fashion, as described above by reference to FIG. 2. After the metadata is extracted from all windows in all of traces, the windowed statistics calculations is started to capture and aggregate joint trace statistics over the plurality of traces. In some embodiments, multiple relational decisions and comparisons are utilized to check for metadata extraction accuracy and error conditions. In some embodiments, subroutines are used to drive parallel operations.

The asynchronous parallelizing trace analytics method for asynchronously parallelizing processing operations in a trace analytics processor and intelligently using metadata about each parallel processing operation to generate analytics results in real time of the present disclosure generally works by first extracting (or gathering) metadata from the input trace (or from multiple input traces) and performing stateless computations about each trace in a parallel manner. In some embodiments, multiple relational decisions and comparisons are utilized to check for metadata extraction accuracy and error conditions. In some embodiments, subroutines are used to drive the stateless computations for each trace or all traces as parallel stateless computation operations. The parallelization of metadata extraction and windowed statistics calculations are actualized by spawning workers as threads or processes, in which each worker handles a specific portion of the trace. The metadata gathered can include event type counts or presence, statistical information (i.e., min, max, average, etc.) on various parameters, the range of a particular parameter, a hash map of certain trace events, and much more. By gathering metadata about each portion of a trace, such information would later be used as hints to the downstream processors on whether this piece has information of interest, or serves as hints to make further processing more efficient. Furthermore, such metadata could make it possible to later compute relationships between various pieces of the traces that would otherwise be unavailable if the traces are computed asynchronously and in parallel.

To make the asynchronous parallelizing trace analytics method for asynchronously parallelizing processing operations in a trace analytics processor and intelligently using metadata about each parallel processing operation to generate analytics results in real time of the present disclosure, one would develop (write code) or engage a team of software developers to develop, build, and produce a software application. When the software application runs on a processing unit of a computing device, one or more input traces can be read directly from file, or via a buffer in memory of the computing device. In some embodiments, the extraction of the windowed metadata is parallelized by spawning workers as threads or processes, with each worker handling a specific window of the trace. In some embodiments, the parallelization of metadata extraction takes place on a single server node. In some other embodiments, the parallelization of metadata extraction is spread out over multiple server nodes in a distributed fashion. In some embodiments, the computation of the windowed statistics is parallelized. In some embodiments, the parallelization of the windowed statistics computation takes place on a single server node. In some embodiments, the parallelization of the windowed statistics computation is spread out over multiple server nodes in a distributed fashion. The extracted metadata can be either saved to file system, a database, or held onto in memory for later use.

Usage of the asynchronous parallelizing trace analytics method for asynchronously parallelizing processing operations in a trace analytics processor and intelligently using metadata about each parallel processing operation to generate analytics results in real time is demonstrated by way of example. Referring to this example, FIG. 4 conceptually illustrates the asynchronous parallelizing trace analytics method performing parallelized metadata extraction and parallelized windowed statistics computation in connection with an exemplary Linux block trace input. This exemplary Linux block trace is demonstrated with respect to a goal of calculating the latency between when a discard operation is performed on a range of logical block accesses (LBA) and when a write happens later in the trace on the same LBA range. This is a practical case where the operating system (OS) performs a discard operation on a range of blocks within a storage device, and it is of interest to know when a write operation will be performed by the OS later to this same range. Such data helps the storage device firmware know how fast it needs to process the discard operation before that range is used again.

Figure 4:
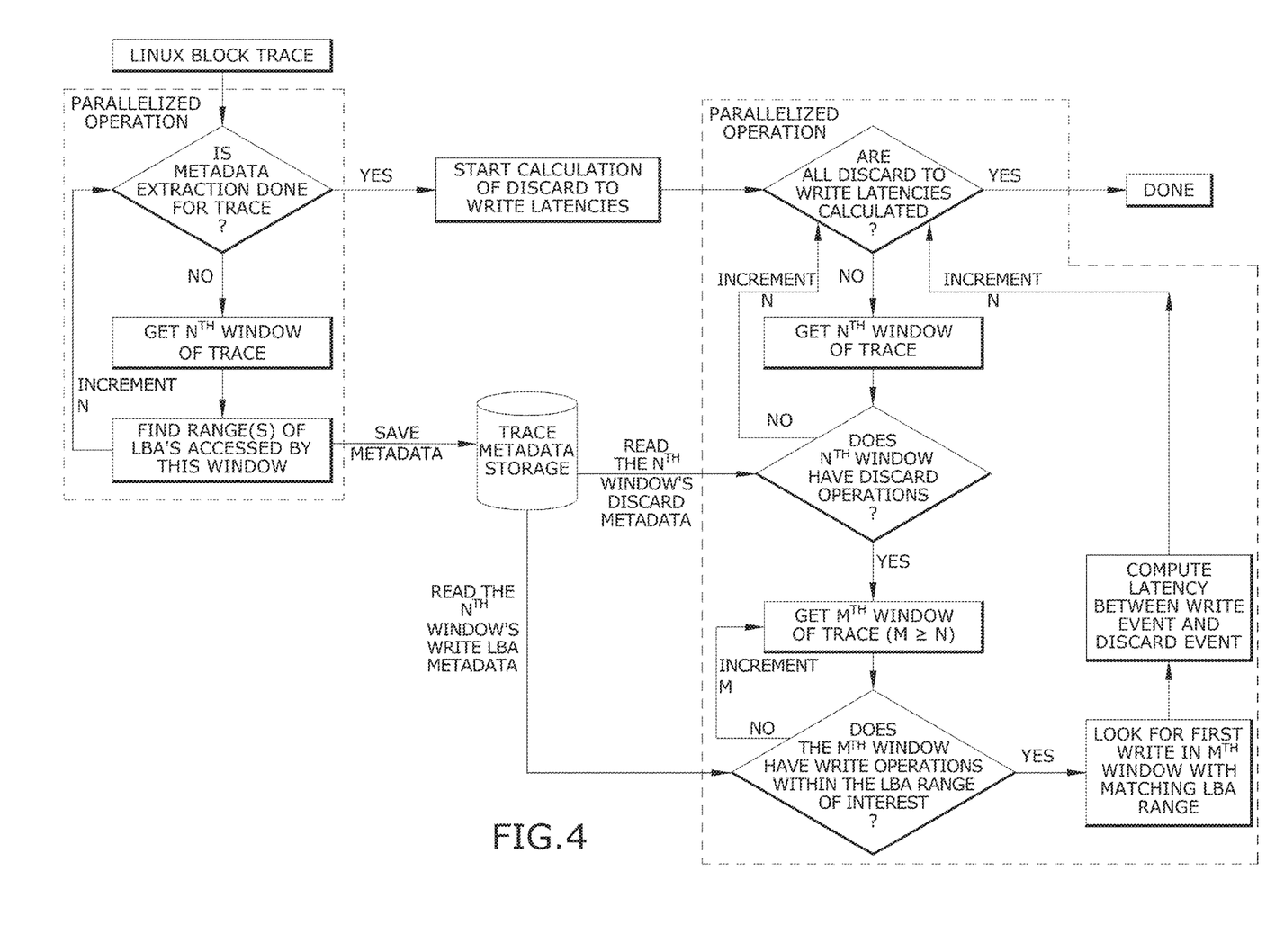
FIG. 4 conceptually illustrates the asynchronous parallelizing trace analytics method performing parallelized metadata extraction and parallelized windowed statistics computation in connection with an exemplary Linux block trace input.

As shown in this figure, the asynchronous parallelizing trace analytics method starts by inputting the Linux block trace. Then the asynchronous parallelizing trace analytics method extracts metadata for each window from the Linux block trace. In this example, the trace metadata includes the range of write LBAs accessed within this window and the range of discard LBAs accessed by within the window. As noted above, the metadata extraction can be done in a parallelized manner for multiple windows, such that the metadata of each window is extracted simultaneously or contemporaneously. Also, the extracted metadata of each window is stored in the trace metadata storage for subsequent retrieval and use.

Next, the asynchronous parallelizing trace analytics method starts calculation of overall trace statistics. In this example, the calculation of overall trace statistics involves calculating the discard to write latencies for overlapping LBA ranges. Starting with the first window (increment counter "N"=1), the asynchronous parallelizing trace analytics method first determines whether there are any discard operations within the ($N^{th}$) window by checking its previously calculated metadata. The previously calculated metadata of the $N^{th}$ window is retrieved from the trace metadata storage (which can be a file storage, a database management system, an in-memory database, or another storage). When there are no discard operations, the asynchronous parallelizing trace analytics method moves ahead to the next window. On the other hand, when there are discard operations for the $N^{th}$ window, the asynchronous parallelizing trace analytics method gets the $M^{th}$ window of the Linux block trace, where the starting value of "M" is equal to the present value of increment counter "N".

In some embodiments, the asynchronous parallelizing trace analytics method then checks the metadata for the $M^{th}$ window to determine whether a write operation occurred within the LBA range of interest in the $M^{th}$ window. When the LBA range of interest in the $M^{th}$ window does not include any write operation(s), the asynchronous parallelizing trace analytics method increments the value of "M" and returns to the step for determining whether a write operation occurred with the LBA range of interest in the $M^{th}$ (as now incremented) window. This process is repeated until a window includes at least one write operation within the LBA range of interest. When such a window is found, the asynchronous parallelizing trace analytics method looks for the first write (if multiple write operations) in the window within the LBA range and computes latency between the write event and the discard event. After calculating the discard to write latencies for the $N^{th}$ window, the asynchronous parallelizing trace analytics method increments the value of "N" and repeats the process of calculating the discard to write latencies for overlapping LBA ranges, for the next window N until all discard to write latencies are calculated. Thus, when the asynchronous parallelizing trace analytics method determines that all discard to write latencies are calculated, the asynchronous parallelizing trace analytics method ends. As before, the operation of calculating discard to write latencies can be parallelized as one window does not depend on the other.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "software application", "processor", "trace analytics processor", and "program" are meant to include firmware residing in read-only memory or applications stored in magnetic storage, which can be read into memory for processing by a processor (CPU, GPU, etc.) of a bare metal computing device or virtual computing device that is supported by at least one bare metal computing device. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
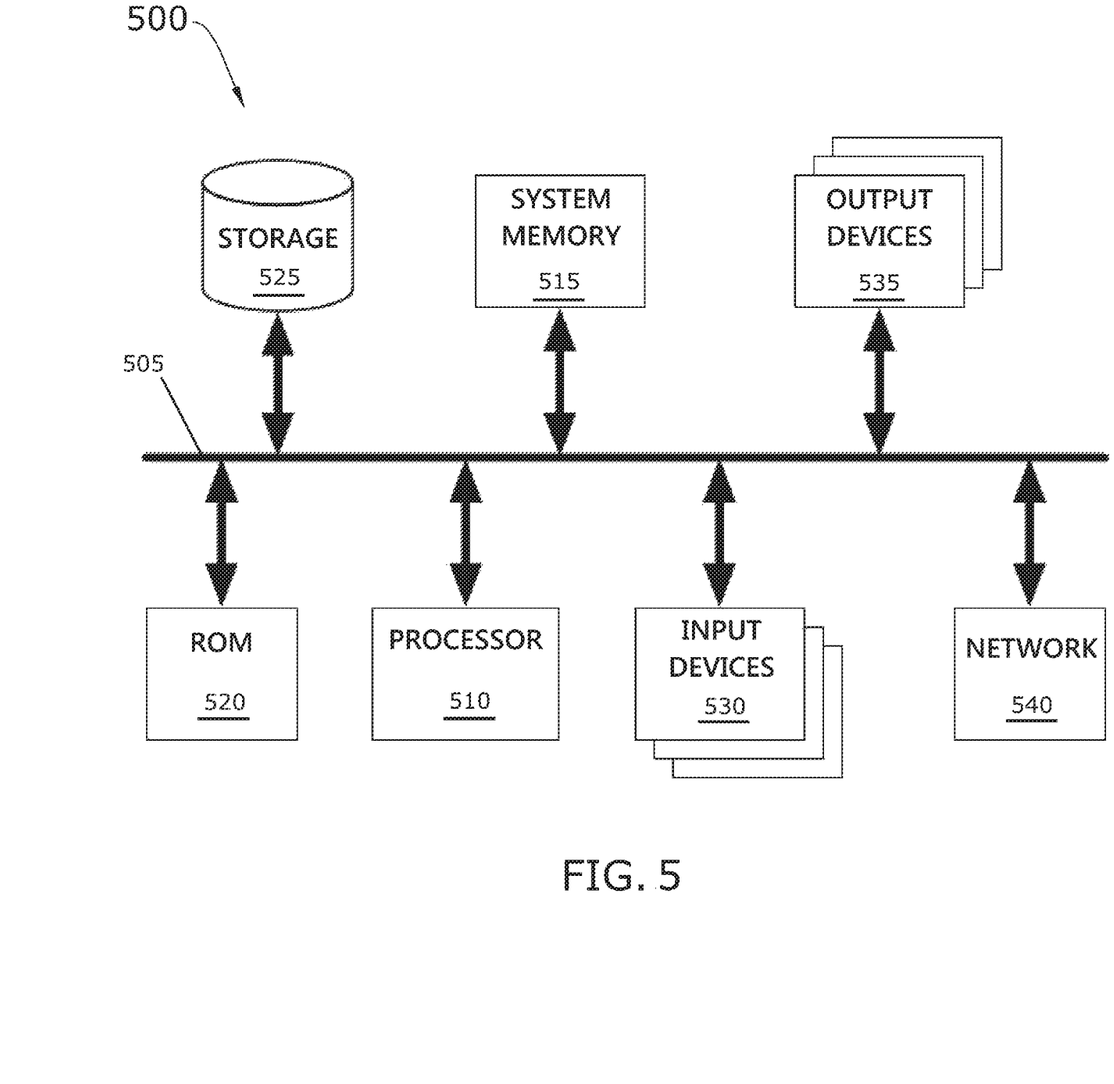
FIG. 5 conceptually illustrates conceptually illustrates an electronic system with which some embodiments of the invention are implemented.

FIG. 5 conceptually illustrates an electronic system 500 with which some embodiments of the invention are implemented. The electronic system 500 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as cathode ray tubes (CRT) or liquid crystal displays (LCD). Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-4 conceptually illustrate methods or processes in which the specific operations of these methods or processes may not be performed in the exact order shown and described. Specific operations may not be performed in one continuous series of operations, and different specific operations may be performed in different embodiments. Furthermore, the methods/processes could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for asynchronously parallelizing processing operation of a parallel, metadata-based trace analytics processor and using metadata about each parallel operation, said method comprising:

reading, by the metadata-based trace analytics processor coupled to a memory, an input trace from a file or the memory, wherein the input trace comprises a plurality of windows, and wherein each of the plurality of windows comprises metadata;

stepping, by the metadata-based trace analytics processor, through the plurality of windows of the input trace and extracting in an asynchronous parallel process, by the metadata-based trace analytics processor, the metadata about each window in the plurality of windows, wherein the asynchronous parallel process of extracting the metadata comprises extracting the metadata for each window in real time with each of the plurality of windows, wherein metadata of one window in the plurality of windows is independent of metadata in each of the plurality of windows;

storing, by the metadata-based trace analytics processor, the extracted metadata about each window in the plurality of windows of the input trace for later use;

starting, by the metadata-based trace analytics processor, a calculation of targeted statistics for the input trace when extraction of metadata about each window in the plurality of windows is completed;

determining, by the metadata-based trace analytics processor, whether the calculation of targeted statistics about each window in the plurality of windows of the input trace is needed by checking the metadata of each window in the plurality of windows in an asynchronous parallel process;

calculating, by the metadata-based trace analytics processor, the targeted statistics for each window in which calculation is determined to be needed in an asynchronous parallel process; and aggregating, by the metadata-based trace analytics processor, a result set of targeted statistics based on the calculations of targeted statistics for the input trace.

2. The method of claim 1, wherein stepping through the plurality of window of the input trace and extracting metadata about each window in the plurality of windows comprises:

determining, by the metadata-based trace analytics processor, whether the metadata extraction is completed for all windows in the plurality of windows of the input trace;

reading, by the metadata-based trace analytics processor, a portion of the input trace included within a particular window in the plurality of windows;

extracting, by the metadata-based trace analytics processor, the metadata about the particular window; and moving, by the metadata-based trace analytics processor, to a next window in the plurality of windows of the input trace.

3. The method of claim 2, wherein the particular window is denoted by an increment value N, wherein the next window is identified by increasing the increment value to N+1.

4. The method of claim 1, wherein stepping, by the processor, through the plurality of window of the input trace and extracting metadata about each window in the plurality of windows comprises:

associating, by the metadata-based trace analytics processor, a plurality of worker threads or processes with the plurality of windows of the input trace; and extracting, by the metadata-based trace analytics processor, the metadata about each window in the plurality of windows by each worker in the plurality of worker threads or processes in parallel.

5. The method of claim 1, wherein calculating, by the metadata-based trace analytics processor, the targeted statistics comprises calculating, by the processor, the targeted statistics for each window in parallel.

6. The method of claim 1, wherein the plurality of windows are aligned in the input trace.

7. The method of claim 1, wherein each window in the plurality of windows overlaps at least one other window in the plurality of windows in the input trace.

8. A multi-trace method for asynchronously parallelizing processing operation of a parallel, metadata-based trace analytics processor and using metadata about each parallel operation, said method comprising:

reading, by metadata-based trace analytics processor coupled to a memory, a plurality of traces from a file or the memory, wherein each of the plurality of traces comprises plurality of windows, and wherein each of the plurality of windows comprises metadata;

stepping, by the metadata-based trace analytics processor, through the plurality of windows of all traces in the plurality of traces and extracting in an asynchronous parallel process, by the metadata-based trace analytics processor, the metadata about each window in the plurality of windows of all traces in the plurality of traces, wherein the asynchronous parallel process of extracting the metadata comprises extracting the metadata for each window in real time with each of the plurality of windows, wherein metadata of one window in the plurality of windows is independent of metadata in each of the plurality of windows;

storing, by the metadata-based trace analytics processor, the extracted metadata about each window in the plurality of windows of all traces in the plurality of traces for later use;

starting, by the metadata-based trace analytics processor, a calculation of targeted statistics for the plurality of traces when extraction of metadata about each window in the plurality of windows of all traces in the plurality of traces is completed;

determining, by the metadata-based trace analytics processor, whether the calculation of targeted statistics about each window in the plurality of windows of all traces in the plurality of traces is needed by checking the metadata of each window in the plurality of windows in an asynchronous parallel process;

calculating, by the metadata-based trace analytics processor, the targeted statistics for each window in which calculation is determined to be needed in an asynchronous parallel process; and aggregating, by the metadata-based trace analytics processor, a result set of targeted statistics based on the calculations of targeted statistics for all traces in the plurality of traces.

9. The multi-trace method of claim 8, wherein stepping, by the metadata-based trace analytics processor, through the plurality of windows of all traces in the plurality of traces and extracting, by the metadata-based trace analytics processor, the metadata about each window in the plurality of windows of all traces in the plurality of traces is performed in parallel by a plurality of worker threads or processes.

10. The multi-trace method of claim 8, wherein calculating, by the metadata-based trace analytics processor, the targeted statistics is performed for all windows in the plurality of windows over all traces in the plurality of traces in parallel by a plurality of worker threads or processes.

* * * * *